US011386103B2

(12) United States Patent
Wang et al.

(10) Patent No.: US 11,386,103 B2
(45) Date of Patent: Jul. 12, 2022

(54) QUERY ENHANCEMENT SYSTEM AND METHOD FOR CONSTRUCTING ELASTIC FIELD BASED ON TIME DELAY

(71) Applicants: INSTITUTE OF ACOUSTICS, CHINESE ACADEMY OF SCIENCES, Beijing (CN); BEIJING HILI TECHNOLOGY CO., LTD, Beijing (CN)

(72) Inventors: Jinlin Wang, Beijing (CN); Yiqiang Sheng, Beijing (CN); Gang Cheng, Beijing (CN); Xiaozhou Ye, Beijing (CN); Haojiang Deng, Beijing (CN); Lingfang Wang, Beijing (CN)

(73) Assignees: INSTITUTE OF ACOUSTICS, CHINESE ACADEMY OF SCIENCES, Beijing (CN); BEIJING HILI TECHNOLOGY CO., LTD., Beijing (CN)

(*) Notice: Subject to any disclaimer, the term of this patent is extended or adjusted under 35 U.S.C. 154(b) by 247 days.

(21) Appl. No.: 16/632,900

(22) PCT Filed: Dec. 21, 2017

(86) PCT No.: PCT/CN2017/117698
§ 371 (c)(1),
(2) Date: Jan. 22, 2020

(87) PCT Pub. No.: WO2019/052075
PCT Pub. Date: Mar. 21, 2019

(65) Prior Publication Data
US 2020/0167357 A1 May 28, 2020

(30) Foreign Application Priority Data
Sep. 18, 2017 (CN) .......................... 201710841537.4

(51) Int. Cl.
*G06F 16/20* (2019.01)
*G06F 16/2458* (2019.01)
(Continued)

(52) U.S. Cl.
CPC ...... *G06F 16/2477* (2019.01); *G06F 16/2228* (2019.01); *G06F 16/24537* (2019.01)

(58) Field of Classification Search
CPC .......... G06F 16/2228; G06F 16/24537; G06F 16/2477
(Continued)

(56) References Cited

U.S. PATENT DOCUMENTS 8,331,263 B2 * 12/2012 Dow ...................... H04L 41/046
370/254
10,015,106 B1 * 7/2018 Florissi .................. G16B 20/00
(Continued)

FOREIGN PATENT DOCUMENTS

CN  103207897 A  7/2013
CN  106844666 A  6/2017
(Continued)

OTHER PUBLICATIONS

Jun. 8, 2018 Search Report issued International Patent Application No. PCT/CN2017/117698.

*Primary Examiner* — Vincent F Boccio
(74) *Attorney, Agent, or Firm* — Oliff PLC

(57) ABSTRACT

A query enhancement system for constructing an elastic field based on a time delay, including: dividing a network node to obtain a set of containers composed of several containers, wherein the containers are nested and each container includes a management node for performing node organization, neighbor maintenance and query services within the container. Further, a query enhancement method for constructing an elastic field based on a time delay includes:
(Continued)

carrying out same-layer non-intersection full-coverage division on a network node to obtain a set of containers that are nested, and execute a query flow without a given low time delay requirement which uses an existing query technique and a nearby query flow with a given low time delay requirement which uses a distributed nearby querying method to carry out a nearby query; with an actual query time delay index Ti less than the requirement of an upper time delay limit Ts.

16 Claims, 1 Drawing Sheet

(51) Int. Cl.
*G06F 16/2453* (2019.01)
*G06F 16/22* (2019.01)

(58) Field of Classification Search
USPC .......................................................... 707/715
See application file for complete search history.

(56) References Cited

U.S. PATENT DOCUMENTS

| 10,547,521 | B1 * | 1/2020 | Roy ....................... H04L 43/045 |
| 10,868,742 | B2 * | 12/2020 | Chitalia .............. H04L 43/0876 |
| 2008/0195584 | A1 | 8/2008 | Nath et al. |

FOREIGN PATENT DOCUMENTS

| CN | 107079044 A | 8/2017 | |
| EP | 1594278 A1 * | 11/2005 | ........... H04L 67/104 |

* cited by examiner

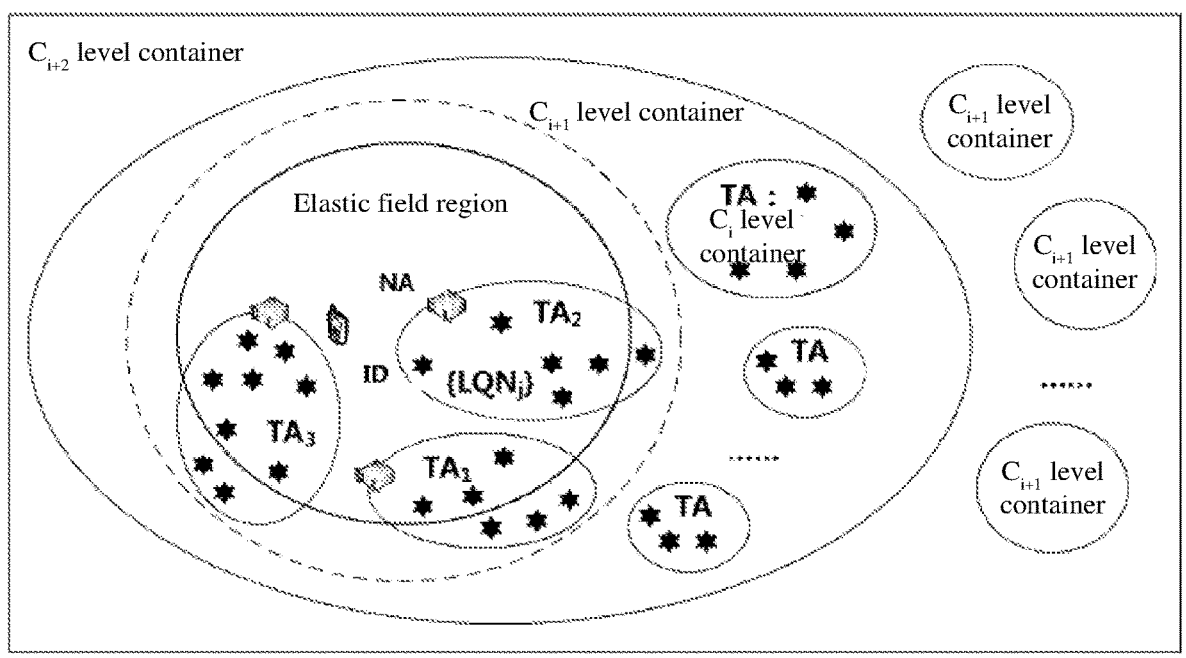

US 11,386,103 B2

QUERY ENHANCEMENT SYSTEM AND METHOD FOR CONSTRUCTING ELASTIC FIELD BASED ON TIME DELAY

The present application claims the priority of the Chinese patent application No. 201710841537.4 filed on Sep. 18, 2017 and entitled "Query Enhancement System and Method for Constructing Elastic Field Based on Time Delay", the contents of which are incorporated by reference herein in its entirety.

TECHNICAL FIELD

The present invention belongs to the field of network technology and network communication technology, and in particular relates to a query enhancement system and method for constructing an elastic field based on time delay.

BACKGROUND ART

In the prior art, distributed query (query) includes: Range query (Range query), aggregation query, Skyline query and Top-k query. Wherein Range query (Range query) means to search all resources with a single or multiple attribute values being within a certain continuity interval, for example, an attribute identification can be acquired through a position-sensitive harsh algorithm on the basis of Chord, and mapping between a single attribute and multiple attributes in a space-filling curve (SFC) technology can be adopted; aggregation query refers to query of some aggregation information, such as count, sum, max, and average, of some attributes in a group of resources; and Skyline query means to select one sub-set from a given set S, wherein any point in the sub-set is not controlled by other points in S, and the control relationship of any two points p over q means that p is superior to q at least in a certain dimension and p is not inferior to q at other dimensions.

As a typical application scenario of distributed query, a resolution system of a mapping relationship between name and address is an indispensable link in data transmission in information-centric networking (ICN), and performance of the resolution system directly influences overall performance of the information-centric networking (ICN). Through a naming mechanism of information-centric networking (ICN), each entity in a network acquires an entity unique identifier (EUID), independent of position and possessing self-verification features, as a name, and through dynamic binding between an EUID and network addresses (NA) of the EUID, communication between entities in information-centric networking (ICN) is realized. Name resolution mainly functions to establish and maintain a mapping relationship between a content name published by a content provider and network address(es), and further find out a proper content provider and his network address through retrieval of a content name. However, the prior art has the following problems:

1) Although a content space is nested and layered through a container or structured technique according to network characteristics, however, the existing partition method is independent of response time and application requirements of a system, while structural service performance independence obviously cannot directly satisfy requirements of time delay;

2) Under an environment which has a higher requirement on mobility and security, an elastic scalable query method according to requirements of response time or performance requirements cannot be provided, and search efficiency and precision cannot be ensured while improving resource utilization rate.

In addition, in the existing distributive query methods, response time of query is generally related to node scale, size of query region, and number of attributes of resources in query (that is, spatial dimension), however, query results cannot be returned within a fixed time delay. In order to solve the above problem, it is necessary to provide a query enhancement system and method for constructing an elastic field based on time delay, so as to satisfy request processing requirements of returning query results within a given low time delay in some application scenarios.

SUMMARY OF THE INVENTION

An object of the present invention is as follows: in order the solve the above problems existing in the existing query enhancement system and method, the present invention provides a query enhancement system for constructing an elastic field based on time delay, thereby effectively solving problems of distributive organization and query, preferably processing application scenarios with given low time delay requirements in information-centric networking (ICN), and realizing distributed nearby query in terms of a position relationship from the near to the distant.

In order to achieve the above object, the present invention provides a query enhancement system for constructing an elastic field based on time delay, including: network nodes are logically divided to obtain a group of containers composed of a plurality of containers; wherein the plurality of containers have a nested relationship, that is, the plurality of containers constitute a group of containers, and each container further includes: a management node used for node organization, neighbor maintenance and query service in the container; wherein logical division refers to repartition of a physical node set according to a given container rule to form a logical node set, such that nodes which are not in a same physical scope can also form a neighborhood relationship; the node organization refers to structured management of nodes in a container to form a logical topological structure; the neighbor maintenance refers to maintenance of a direct connection state in a logical topological structure; and the query service refers to retrieval of a database after a request is received to return requested contents.

The query enhancement system for constructing an elastic field based on time delay specifically includes: based on a time delay index set $\{Ti\}$, network nodes are logically divided, wherein each time delay index $Ti$ corresponds to a layer of $Ci$ level container with no intersection and full coverage, the $Ci$ level containers have a nested relationship therebetween, that is, multiple $Ci$ level containers constitute a $Ci+1$ level container, wherein $Ti<Ti+1$, $1 \le i \le I-1$, $I$ is the number of layers of nested containers, and $Ti$ is an actual query time delay index.

A management topology of a query enhancement system for constructing an elastic field based on time delay is a tree structure, and a root node is a management node of a CI level container; any local query node accessed by a query request is denoted as $LQNj$, and forms an elastic field region together with a $Ci$ level container containing a local query node ($LQNj$) and neighbors of the container, so as to satisfy requirements of a query that the time delay index set $\{Ti\}$ is smaller than any given time delay upper limit $Ts$.

The requirement of a query that the time delay index set $\{Ti\}$ is smaller than any given time delay upper limit $Ts$ specifically includes:

a) when $Ts<T1$ and $i=1$, querying in an LQNj receiving a query request, a C1 level container containing LQNj, and neighbors of the container;

b) when $Ti \leq Ts<Ti+1$, querying in a Ci level container containing LQNj and its neighbors;

c) when $Ts \geq TI$, $i=I$, querying in a CI level container containing LQNj.

Based on a query enhancement system for constructing an elastic field based on time delay, the present invention further discloses a query enhancement method for constructing an elastic field based on time delay, including: network nodes are subjected to logical division with no intersection and full coverage on each layer, to obtain a group of containers composed of a plurality of containers, the plurality of containers have a nested relationship, and respectively perform a query flow without given low time delay requirements and a nearby query flow with given low time delay requirements; wherein the query flow without given low time delay requirements is realized by adopting an existing query technology;

the query flow with a given low time delay requirement adopts a distributed nearby query method for nearby query, such that an actual query time delay index Ti is smaller than the requirements of a certain time delay upper limit Ts, specifically including:

step 1), when $Ti<Ts$, receiving, by a certain local query node (LQNj), a query request under given low time delay requirements aiming at a certain unique entity identifier (ID), wherein Ti is an actual query time delay index, and Ts is an upper limit of time delay;

step 2), when $i=1$, judging whether $Ts<T1$ is satisfied, if $Ts<T1$, then going to the next step; if Ts is greater than or equal to T1, then skipping to step 4);

step 3), when $Ts<T1$ and $i=1$, querying in an LQNj receiving a query request, a C1 level container containing LQNj and neighbors of the container; if successfully querying network address(es) corresponding to an identifier, then directly returning query results; if failing to query a network address corresponding to an identifier, then returning failure of query;

step 4), for any one satisfying $1 \leq i \leq I-1$, checking whether $Ti \leq Ts<Ti+1$ is satisfied: if satisfying $Ti \leq Ts<Ti+1$, then going to the next step, if not satisfying $Ti \leq Ts<Ti+1$, then skipping to step 7);

step 5), when $Ti \leq Ts<Ti+1$, forwarding a query request to a query node of a Ci level container containing LQNj, and denoting the container as Cik, and performing preliminary query in the Cik and its neighbor list {Cim}; if successfully querying network address(es) corresponding to an identifier, then going to the next step; if failing to query a network address corresponding to an identifier, then returning failure of query;

step 6), querying in the Cik and its neighbor list {Cim}; if successfully querying network address(es) corresponding to an identifier, then directly returning query results, if failing to query a network address corresponding to an identifier, then returning failure of query;

step 7), performing preliminary query in a CI level container containing LQNj; if successfully querying network address(es) corresponding to an identifier, then going to the next step; if failing to query a network address corresponding to an identifier, then skipping to step 9);

step 8), querying in a CI level container containing LQNj; if successfully querying network address(es) corresponding to an identifier, then directly returning query results; if failing to query a network address corresponding to an identifier, then going to the next step;

step 9), querying a neighbor list {CIm} of a CI level container containing LQNj through inter-domain exchange; if successfully querying network address(es) corresponding to an identifier in a certain CI level container, then denoting the container as CIp, and going to the next step; if failing to query a network address corresponding to an identifier, then returning failure of query; and step 10), forwarding a query request to CIp, and querying in the CIp; if successfully querying network address(es) corresponding to an identifier, then directly returning query results; if failing to query a network address corresponding to an identifier, then returning failure of query;

preferably, in step 3), query is performed in an LQNj receiving a query request, a C1 level container containing LQNj, and local hash table (HT) in neighbors;

preferably, in step 5), query is performed in a bloom filter (BF) in the Cik and its neighbor list {Cim};

preferably, in step 6), query is performed in a distributed hash table (DHT) in the Cik and its neighbor list {Cim};

preferably, in step 7), preliminary query is performed in a bloom filter (BF) in a CI level container containing LQNj;

preferably, in step 8), query is performed in a distributed hash table (DHT) in a CI level container containing LQNj;

preferably, in step 9), query is performed in a bloom filter (BF) in a neighbor list {CIm} of a CI level container containing LQNj; and preferably, query is performed in a distributed hash table (DHT) in the CIp.

In the above technical solution, as to a nearby query flow with given low time delay requirements, in order to save maintenance costs, a neighbor list {C1m} of C1k can be degraded into a C1 level container without neighbors, and a specific query flow includes:

step 1), when $Ti<Ts$, a certain local query node (LQNj) receives a query request with given low time delay requirements aiming at a certain unique entity identifier (ID), wherein Ti is an actual query time delay index, and Ts is an upper limit of time delay;

step 2), when $i=1$, judging whether $Ts<T1$ is satisfied: if $Ts<T1$, then going to the next step; if Ts is greater than or equal to T1, then skipping to step 4);

step 3), when $Ts<T1$ and $i=1$, querying in an LQNj receiving a query request, a C1 level container containing LQNj, and its neighbors; if successfully querying network address(es)corresponding to an identifier, then directly returning query results; if failing to query a network address corresponding to an identifier, then returning failure of query;

step 4), for any one satisfying $1 \leq i \leq I-1$, checking whether $Ti \leq Ts<Ti+1$ is satisfied: if satisfying $Ti \leq Ts<Ti+1$, then going to the next step, if not satisfying $Ti \leq Ts<Ti+1$, then skipping to step 7);

step 5), when $Ti \leq Ts<Ti+1$, forwarding a query request to a query node of a Ci level container containing LQNj, and denoting the container as Cik, and performing preliminary query in the Cik and its neighbor list {Cim}; if successfully querying network address(es)corresponding to an identifier, then going to the next step; if failing to query a network address corresponding to an identifier, then returning failure of query;

step 6), querying in the Cik and its neighbor list {Cim}; if successfully querying network address(es)corresponding to an identifier, then directly returning query results, if failing to query a network address corresponding to an identifier, then returning failure of query;

step 7), performing preliminary query in a CI level container containing LQNj; if successfully querying network address(es)corresponding to an identifier, then going to the next step; if failing to query a network address corresponding to an identifier, then skipping to step 9); and step 8), querying in a CI level container containing LQNj; if successfully querying network address(es)corresponding to an identifier, then directly returning query results; if failing to query a network address corresponding to an identifier, then going to the next step; preferably, in step 5), query is performed in a bloom filter (BF) in the Cik and its neighbor list {Cim};

preferably, in step 6), query is performed in a distributed hash table (DHT) in the Cik and its neighbor list {Cim}; preferably, in step 7), preliminary query is performed in a bloom filter (BF) in a CI level container containing LQNj;

preferably, in step 8), query is performed in a distributed hash table (DHT) in a CI level container containing LQNj;

The present invention has the following advantages: aiming at various time delay sensitive applications including low time delay and high reliability, the present invention discloses a query enhancement system and method for constructing an elastic field based on time delay, and satisfies request processing requirements of returning query results within a given low time delay. Through a distributed nearby query in terms of a position relationship from the near to the distant, and through priority processing of low time delay application scenarios, overall query time can be shortened dramatically.

BRIEF DESCRIPTION OF DRAWINGS

FIG. 1 is a frame diagram of a query enhancement system for constructing an elastic field based on time delay of the present invention.

DETAILED DESCRIPTION OF THE EMBODIMENTS

As shown in FIG. 1, the present invention provides a query enhancement system for constructing an elastic field based on time delay, including: network nodes are logically divided to obtain a group of containers composed of a plurality of containers; wherein the plurality of containers have a nested relationship, that is, the plurality of containers constitute a group of containers, and each container further includes: a management node used for node organization, neighbor maintenance and query service in the container; wherein logical division refers to repartition of a physical node set according to a given container rule to form a logical node set, such that nodes which are not in a same physical scope can also form a neighborhood relationship; the node organization refers to structured management of nodes in a container to form a logical topological structure; the neighbor maintenance refers to maintenance of a direct connection state in a logical topological structure; and the query service refers to retrieval of a database after a request is received to return requested contents.

The query enhancement system for constructing an elastic field based on time delay specifically includes: based on a time delay index set $\{Ti\}$, network nodes are logically divided, wherein each time delay index $Ti$ corresponds to a layer of $Ci$ level container with no intersection and full coverage, the $Ci$ level containers have a nested relationship therebetween, that is, multiple $Ci$ level containers constitute a $Ci+1$ level container, wherein $Ti<Ti+1$, $1 \le i \le I-1$, $I$ is the number of layers of nested containers, and $Ti$ is an actual query time delay index.

A management topology of a query enhancement system for constructing an elastic field based on time delay is a tree structure, and a root node is a management node of a CI level container; any local query node accessed by a query request is denoted as LQNj, and forms an elastic field region together with a Ci level container containing a local query node (LQNj) and neighbors of the container, so as to satisfy requirements of a query that the time delay index $\{Ti\}$ is smaller than any given time delay upper limit Ts.

The requirement of a query that the time delay index set $\{Ti\}$ is smaller than any given time delay upper limit Ts specifically includes:

a) when $Ts<T1$ and $i=1$, querying in an LQNj receiving a query request, a C1 level container containing LQNj, and neighbors of the container;

b) when $Ti \le Ts < Ti+1$, querying in a Ci level container containing LQNj and its neighbors; and c) when $Ts \ge TI$, $i=I$, querying in a CI level container containing LQNj.

Based on a query enhancement system for constructing an elastic field based on time delay, the present invention further discloses a query enhancement method for constructing an elastic field based on time delay, including: network nodes are subjected to logical division with no intersection and full coverage on each layer, to obtain a group of containers composed of a plurality of containers, the plurality of containers have a nested relationship, and respectively perform a query flow without given low time delay requirements and a nearby query flow with given low time delay requirements; wherein the query flow without given low time delay requirements is realized by adopting the existing query technology;

the query flow with given low time delay requirements adopts a distributed nearby query method for nearby query, such that an actual query time delay index $Ti$ is smaller than the requirements of a certain time delay upper limit Ts, specifically including:

step 1), when $Ti<Ts$, receiving, by a certain local query node (LQNj), a query request under given low time delay requirements aiming at a certain unique entity identifier (ID), wherein $Ti$ is an actual query time delay index, and $Ts$ is an upper limit of time delay;

step 2), when $i=1$, judging whether $Ts<T1$ is satisfied, if $Ts<T1$, then going to the next step; if Ts is greater than or equal to T1, then skipping to step 4);

step 3), when $Ts<T1$ and $i=1$, querying in an LQNj receiving a query request, a C1 level container containing LQNj and its neighbors; if successfully querying network address(es)corresponding to an identifier, then directly returning query results; if failing to query a network address corresponding to an identifier, then returning failure of query;

step 4), for any one satisfying $1 \le i \le I-1$, checking whether $Ti \le Ts < Ti+1$ is satisfied: if satisfying $Ti \le Ts < Ti+1$, then going to the next step, if not satisfying $Ti \le Ts < Ti+1$, then skipping to step 7);

step 5), when $Ti \le Ts < Ti+1$, forwarding a query request to a query node of a Ci level container containing LQNj, and denoting the container as Cik, and performing preliminary query in the Cik and its neighbor list {Cim}; if successfully querying network address(es)corresponding to an identifier, then going to the next step; if failing to query a network address corresponding to an identifier, then returning failure of query;

step 6), querying in the Cik and its neighbor list {Cim}; if successfully querying network address(es)corresponding to an identifier, then directly returning query results, if failing to query a network address corresponding to an identifier, then returning failure of query;

step 7), performing preliminary query in a CI level container containing LQNj; if successfully querying network address(es) corresponding to an identifier, then going to the next step; if failing to query a network address corresponding to an identifier, then skipping to step 9);

step 8), querying in a CI level container containing LQNj; if successfully querying network address(es) corresponding to an identifier, then directly returning query results; if failing to query a network address corresponding to an identifier, then going to the next step;

step 9), querying a neighbor list {CIm} of a CI level container containing LQNj through inter-domain exchange; if successfully querying network address(es) corresponding to an identifier in a certain CI level container, then denoting the container as CIp, and going to the next step; if failing to query a network address corresponding to an identifier, then returning failure of query; and step 10), forwarding a query request to CIp, and querying in the CIp; if successfully querying network address(es) corresponding to an identifier, then directly returning query results; if failing to query a network address corresponding to an identifier, then returning failure of query;

preferably, in step 3), query is performed in an LQNj receiving a query request, a C1 level container containing LQNj, and a local hash table (HT) in neighbors;

preferably, in step 5), query is performed in a bloom filter (BF) in the Cik and its neighbor list {Cim};

preferably, in step 6), query is performed in a distributed hash table (DHT) in the Cik and its neighbor list {Cim};

preferably, in step 7), preliminary query is performed in a bloom filter (BF) in a CI level container containing LQNj;

preferably, in step 8), query is performed in a distributed hash table (DHT) in a CI level container containing LQNj;

preferably, in step 9), query is performed in a bloom filter (BF) in a neighbor list {CIm} of a CI level container containing LQNj; and preferably, query is performed in a distributed hash table (DHT) in the CIp.

In the above technical solution, as to a nearby query flow with given low time delay requirements, in order to save maintenance costs, a neighbor list {C1m} of C1k can be degraded into a C1 level container without neighbors, and a specific query flow includes:

step 1), when $Ti<Ts$, a certain local query node (LQNj) receives a query request under given low time delay requirements aiming at a certain unique entity identifier (ID), wherein Ti is a current actual query time delay index, and Ts is an upper limit of time delay;

step 2), when i=1, judging whether $Ts<T1$ is satisfied: if $Ts<T1$, then going to the next step; if Ts is greater than or equal to T1, then skipping to step 4);

step 3), when $Ts<T1$ and i=1, querying in an LQNj receiving a query request, a C1 level container containing LQNj, and neighbors of the container; if successfully querying network address(es) corresponding to an identifier, then directly returning query results; if failing to query a network address corresponding to an identifier, then returning failure of query;

step 4), for any one satisfying $1\leq i\leq I-1$, checking whether $Ti\leq Ts<Ti+1$ is satisfied: if satisfying $Ti\leq Ts<Ti+1$, then going to the next step, if not satisfying $Ti\leq Ts<Ti+1$, then skipping to step 7);

step 5), when $Ti\leq Ts<Ti+1$, forwarding a query request to a query node of a Ci level container containing LQNj, and denoting the container as Cik, and performing preliminary query in the Cik and its neighbor list {Cim}; if successfully querying network address(es) corresponding to an identifier, then going to the next step; if failing to query a network address corresponding to an identifier, then returning failure of query;

step 6), querying in the Cik and its neighbor list {Cim}; if successfully querying network address(es) corresponding to an identifier, then directly returning query results, if failing to query a network address corresponding to an identifier, then returning failure of query;

step 7), performing preliminary query in a CI level container containing LQNj; if successfully querying network address(es) corresponding to an identifier, then going to the next step; if failing to query a network address corresponding to an identifier, then skipping to step 9);

step 8), querying in a CI level container containing LQNj; if successfully querying network address(es) corresponding to an identifier, then directly returning query results; if failing to query a network address corresponding to an identifier, then going to the next step;

preferably, in step 5), query is performed in a bloom filter (BF) in the Cik and its neighbor list {Cim};

preferably, in step 6), query is performed in a distributed hash table (DHT) in the Cik and its neighbor list {Cim};

preferably, in step 7), preliminary query is performed in a bloom filter (BF) in a CI level container containing LQNj;

preferably, in step 8), query is performed in a distributed hash table (DHT) in a CI level container containing LQNj;

Finally, it should be noted that, the above embodiments are merely used for explaining technical solutions of the present invention, rather than for limiting the present invention. Although the present invention has been described in detail with reference to embodiments, those skilled in the art should understand that, any modifications or equivalent substitutions made to the technical solutions of the present invention all do not depart from spirit and scope of the technical solutions of the present invention, and should be encompassed in the scope of claims of the present invention.

The invention claimed is:

1. A query enhancement system for constructing an elastic field based on time delay, wherein:

network nodes are subjected to logical division to obtain a group of containers composed of a plurality of containers, wherein the plurality of containers have a nested relationship, and the plurality of containers constitute the group of containers, and each container further comprises: a management node used for node organization, neighbor maintenance, and a query service in the container, wherein based on a time delay index set {Ti} including at least one time delay index Ti, the network nodes are logically divided, each of the at least one time delay index Ti corresponds to a layer of a Ci level container with no intersection and full coverage of a plurality of Ci level containers, the Ci level containers have a nested relationship such that multiple Ci level containers constitute a Ci+1 level container, $Ti<Ti+1$, $1\leq i\leq I-1$, I is a number of layers of nested containers, and each of the at least one time delay index Ti is an actual query time delay index.

2. The query enhancement system of claim 1, wherein a management topology of the query enhancement system is a tree structure, and a root node is a management node of a CI level container; and a local query node accessed by any query request is denoted as LQNj, and forms an elastic field region together with a Ci level container containing the local query node LQNj and neighbors of the Ci level container, so as to satisfy requirements of a query that the time delay index set {Ti} is smaller than any given time delay upper limit Ts.

3. The query enhancement system of claim 2, wherein a query flow for the query comprises:
   a) when Ts<T1 and i=1, and the local query node LQNj receives a query request, querying in the local query node LQNj, a C1 level container containing the local query node LQNj, and neighbors of the C1 level container containing the local query node LQNj;
   b) when Ti≤Ts<Ti+1, querying in the Ci level container containing the local query node LQNj and neighbors of the Ci level container containing the local query node LQNj; and
   c) when Ts≥TI and i=I, querying in a CI level container containing the local query node LQNj.

4. A query enhancement method, he method comprising:
   subjecting network nodes to logical division with no intersection and full coverage on each layer, to obtain a group of containers composed of a plurality of containers, wherein the plurality of containers have a nested relationship, the plurality of containers constitute the group of containers, and each container comprises a management node used for node organization, neighbor maintenance, and a query service in the container; and
   respectively performing a query flow without given time delay requirements and a nearby query flow with given time delay requirements
   the query flow without given time delay requirements adopts existing query technologies, including direct mapping, aggregation query, Skyline query, and Top-k query, to realize a query, so as to obtain at least one network address corresponding to an identifier, and;
   as to the nearby query flow with given time delay requirements, a distributed nearby query method is adopted for a nearby query, such that the actual query time delay index Ti is smaller than the requirement of a certain time delay upper limit Ts.

5. The query enhancement method of claim 4, wherein the nearby query flow comprises:
   step 1), when Ti<Ts, receiving, by a certain local query node LQNj, a query request with given low time time delay requirements aiming at a certain unique entity identifier ID;
   step 2), when i=1, judging whether Ts<T1 is satisfied, if Ts<T1, then going to the next step; if Ts is greater than or equal to T1, then skipping to step 4);
   step 3), when Ts<T1 and i=1, querying in the certain local query node LQNj, a C1 level container containing the certain local query node LQNj and neighbors of the C1 level container; if querying of the at least one network address corresponding to the identifier succeeds, then directly returning query results; if querying of the at least one network address corresponding to the identifier fails, then returning failure of query;
   step 4), for any i satisfying 1≤i≤I-1, checking whether Ti≤Ts<Ti+1 is satisfied: if Ti≤Ts<Ti+1 is satisfied, then going to the next step, if Ti<Ts≤Ti+1 is not satisfied, then skipping to step 7);
   step 5), when Ti≤Ts<Ti+1, forwarding the query request to the certain local query node LQNj of a Ci level container containing the certain local query node LQNj, and denoting the container as Cik, and performing a preliminary query in the Cik and a neighbor list {Cim} of the Cik; if querying of the at least one network address corresponding to the identifier succeeds, then going to the next step; if querying of the at least one network address corresponding to the identifier fails, then returning failure of query;
   step 6), querying in the Cik and the neighbor list {Cim}; if querying of the at least one network address corresponding to the identifier succeeds, then directly returning query results, if querying of the at least one network address corresponding to the identifier fails, then returning failure of query;
   step 7), performing a preliminary query in a CI level container containing the certain local query node LQNj; if querying of the at least one network address corresponding to the identifier succeeds, then going to the next step; if querying of the at least one network address corresponding to the identifier fails, then skipping to step 9);
   step 8), querying in the CI level container containing the certain local query node LQNj; if querying of the at least one network address corresponding to the identifier succeeds, then directly returning query results; if querying of the at least one network address corresponding to the identifier fails, then going to the next step;
   step 9), querying a neighbor list {CIm} of the CI level container containing the certain local query node LQNj through inter-domain exchange; if querying of the at least one network address corresponding to the identifier in a certain CI level container succeeds, then denoting the certain CI level container as CIp, and going to the next step; if querying of the at least one network address corresponding to the identifier fails, then returning failure of query; and
   step 10), forwarding the query request to the CIp, and querying in the CIp; if querying of the at least one network address corresponding to the identifier succeeds, then directly returning query results; if querying of the at least one network address corresponding to the identifier fails, then returning failure of query.

6. The query enhancement method of claim 5, wherein in step 3), the nearby query is performed in the certain local query node LQNj receiving the query request, the C1 level container containing the certain local query node LQNj, and a local hash table HT in the neighbors of the C1 level container.

7. The query enhancement method of claim 5, wherein in step 5), the nearby query is performed in a bloom filter BF in the Cik and the neighbor list {Cim}.

8. The query enhancement method of claim 5, wherein in step 6), the nearby query is performed in a distributed hash table DHT in the Cik and the neighbor list {Cim}.

9. The query enhancement method of claim 5, wherein in step 7), the preliminary query is performed in a bloom filter BF in the CI level container containing the certain local query node LQNj.

10. The query enhancement method of claim 5, wherein in step 8), the nearby query is performed in a distributed hash table DHT in the CI level container containing the certain local query node LQNj.

11. The query enhancement method of claim 5, wherein in step 9), the nearby query is performed in a bloom filter BF in the neighbor list {CIm} of the CI level container containing the certain local query node LQNj.

12. The query enhancement method of claim 5, wherein in step 10), the nearby query is performed in a distributed hash table DHT in the CIp.

13. The query enhancement method of claim 4, wherein
a neighbor list {C1m} of C1k can be degraded into a C1 level container without neighbors, and
the nearby query flow comprises:
step 1), when Ti<Ts, receiving, by a certain local query node LQNj, a query request with given time delay requirements aiming at a certain unique entity identifier ID;
step 2), when i=1, judging whether Ts<T1 is satisfied, if Ts<T1, then going to the next step; if Ts is greater than or equal to T1, then skipping to step 4);
step 3), when Ts<T1 and i=1, querying in the certain local query node LQNj receiving the query request, a C1 level container containing the certain local query node LQNj and neighbors of the C1 level container; if querying of the at least one network address corresponding to the identifier succeeds, then directly returning query results; if querying of the at least one network address corresponding to the identifier fails, then returning failure of query;
step 4), for any i satisfying 1<i<I-1, checking whether Ti≤Ts<Ti+1 is satisfied, if Ti≤Ts<Ti+1 is satisfied, then going to the next, step; if Ti≤Ts<Ti+1 is not satisfied, then skipping to step 7);
step 5), when Ti<Ts<Ti+1, forwarding a-the query request to the certain local query node of a Ci level container which contains the certain local query node LQNj and is denoted as Cik, and performing a preliminary query in the Cik and a neighbor list {Cim} of the Cik; if querying of the at least one network address corresponding to the identifier succeeds, then going to the next step; if querying of the at least one network address corresponding to the identifier fails, then returning failure of query;
step 6), querying in the Cik and its neighbor list {Cim}; if querying of the at least one network address corresponding to the identifier succeeds, then directly returning query results, if querying of the at least one network address corresponding to the identifier fails, then returning failure of query;
step 7), performing a preliminary query in a CI level container containing the certain local query node LQNj; if querying of the at least one network address corresponding to the identifier succeeds, then going to the next step; if querying of the at least one network address corresponding to the identifier fails, then skipping step 8); and
step 8), querying in the CI level container containing the certain local query node LQNj; if querying of the at least one network address corresponding to the identifier succeeds, then directly returning query results.

14. The query enhancement method of claim 4, wherein based on a time delay index set {Ti} including at least one time delay index Ti, the network nodes are logically divided, each of the at least one time delay index Ti corresponds to a layer of a Ci level container with no intersection and full coverage of a plurality of Ci level containers, the Ci level containers have a nested relationship such that multiple Ci level containers constitute a Ci+1 level container, Ti<Ti+1, 1<i<I-1, I is a number of layers of nested containers, and each of the at least one time delay index Ti is an actual query time delay index.

15. The query enhancement method of claim 14, wherein
a management topology of the query enhancement method is a tree structure, and a root node is a management node of a CI level container; and
a local query node accessed by any query request is denoted as LQNj, and forms an elastic field region together with a Ci level container containing the local query node LQNj and neighbors of the Ci level container, so as to satisfy requirements of a query that the time delay index set {Ti} is smaller than any given time delay upper limit Ts.

16. The query enhancement method of claim 15, wherein a query flow for the query comprises:
a) when Ts<T1 and i=1, and the local query node LQNj receives a query request, querying in the local query node LQNj, a C1 level container containing the local query node LQNj, and neighbors of the C1 level container containing the local query node LQNj;
b) when Ti<Ts<Ti+1, querying in the Ci level container containing the local query node LQNj and neighbors of the Ci level container containing the local query node LQNj; and
c) when Ts>TI and i=I, querying in a CI level container containing the local query node LQNj.

* * * * *